US008359355B2

(12) United States Patent
O'Sullivan et al.

(10) Patent No.: US 8,359,355 B2
(45) Date of Patent: Jan. 22, 2013

(54) SYSTEM AND METHOD FOR VERIFYING ACCESS TO CONTENT

(75) Inventors: Patrick Joseph O'Sullivan, Ballsbridge (IE); Robert Cameron Weir, Westford, MA (US); Edith Helen Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1076 days.

(21) Appl. No.: 11/872,896

(22) Filed: Oct. 16, 2007

(65) Prior Publication Data

US 2009/0100346 A1    Apr. 16, 2009

(51) Int. Cl.
    G06F 15/16    (2006.01)
(52) U.S. Cl. ........................................ 709/206
(58) Field of Classification Search .............. 709/206
    See application file for complete search history.

(56) References Cited

U.S. PATENT DOCUMENTS

| | | | | |
|---|---|---|---|---|
| 5,479,472 | A * | 12/1995 | Campana et al. | 455/412.1 |
| 5,996,011 | A * | 11/1999 | Humes | 709/225 |
| 6,275,848 | B1 * | 8/2001 | Arnold | 709/206 |
| 6,563,913 | B1 * | 5/2003 | Kaghazian | 379/93.24 |
| 6,687,741 | B1 | 2/2004 | Ramaley et al. | |
| 7,367,048 | B2 * | 4/2008 | Kelley et al. | 726/2 |
| 7,720,828 | B2 * | 5/2010 | Bookstaff | 707/705 |
| 7,870,206 | B2 | 1/2011 | Heidloff et al. | |
| 8,081,332 | B2 * | 12/2011 | Nagarajan et al. | 358/1.15 |
| 2002/0013817 | A1 * | 1/2002 | Collins et al. | 709/206 |
| 2002/0059525 | A1 * | 5/2002 | Estes et al. | 713/200 |
| 2002/0107931 | A1 * | 8/2002 | Singh et al. | 709/206 |
| 2003/0237005 | A1 * | 12/2003 | Bar-Or et al. | 713/201 |
| 2004/0034688 | A1 * | 2/2004 | Dunn | 709/206 |
| 2004/0078334 | A1 * | 4/2004 | Malcolm et al. | 705/50 |
| 2004/0153515 | A1 * | 8/2004 | Touboul et al. | 709/206 |
| 2004/0243832 | A1 * | 12/2004 | Wilf et al. | 713/200 |
| 2005/0086313 | A1 * | 4/2005 | Lucas et al. | 709/206 |
| 2005/0193145 | A1 * | 9/2005 | Brown et al. | 709/238 |
| 2005/0289446 | A1 | 12/2005 | Moncsko et al. | |
| 2006/0041625 | A1 * | 2/2006 | Chen et al. | 709/206 |
| 2006/0184628 | A1 | 8/2006 | Coley et al. | |
| 2006/0224679 | A1 * | 10/2006 | Kikuchi et al. | 709/206 |
| 2007/0106736 | A1 * | 5/2007 | Shepherd | 709/206 |
| 2007/0112927 | A1 * | 5/2007 | Jung | 709/206 |
| 2008/0222257 | A1 * | 9/2008 | Mukherjee et al. | 709/206 |
| 2008/0256187 | A1 * | 10/2008 | Kay | 709/206 |
| 2009/0077182 | A1 * | 3/2009 | Banjara et al. | 709/206 |

(Continued)

OTHER PUBLICATIONS

Fowler, et al., "The evolution of a manufacturing Web site", Computer Networks, 33 (2000) 365-376.

(Continued)

*Primary Examiner* — Jeffrey R Swearingen
(74) *Attorney, Agent, or Firm* — Holland & Knight LLP; Brian J. Colandreo, Esq.; Jeffrey T. Placker, Esq.

(57) ABSTRACT

A method and computer program product for receiving an indication of an email being generated for at least one recipient. The email is analyzed to determine if the email includes at least one link to a piece of content on a remote content resource. If the email includes at least one link to a piece of content on a remote content resource, the at least one recipient is analyzed to determine if the at least one recipient has sufficient rights to access the piece of content on the remote content resource.

20 Claims, 4 Drawing Sheets

U.S. PATENT DOCUMENTS

| | | | |
|---|---|---|---|
| 2009/0100073 A1* | 4/2009 | Dargahi et al. | 707/100 |
| 2009/0248808 A1* | 10/2009 | Izumi et al. | 709/206 |
| 2010/0023492 A1* | 1/2010 | Lucas | 709/206 |
| 2010/0169295 A1* | 7/2010 | Kanamori | 707/706 |
| 2010/0169440 A1* | 7/2010 | O'Sullivan et al. | 709/206 |
| 2011/0029615 A1* | 2/2011 | Shaffer et al. | 709/206 |

OTHER PUBLICATIONS

Schwartz, "Web Wandering for Broken Lines", new.architect Internet Strategies for Technology Leaders, Oct. 1996 (10 pages).

* cited by examiner

SYSTEM AND METHOD FOR VERIFYING ACCESS TO CONTENT

TECHNICAL FIELD

This disclosure relates to email messages that include embedded links and, more particularly, to email messages that include embedded links to content stored on a restricted-access resource.

BACKGROUND

Today, email may be used as a general tool for broad collaboration. Email has led to an explosion of messaging in which many people are copied/respond and use this mechanism to e.g., communicate, and share content. However, the mechanisms that we have to send, receive and process email and content therein do not lend themselves to collaboration.

For example, the explosion of messaging has resulted in situations where codependent technologies represent an obstacle to effective collaboration. Specifically, the association of a link in an email with document libraries, team rooms, or content within databases is a very powerful capability that allows an email recipient to select a link that in turn brings them to a central repository that stores the information referenced. This, in turn, keeps email messages short and concise, thus reducing duplication and unnecessary propagation of content.

Unfortunately, circumstances often arise in which an email recipient may not have access to the content being referenced, as the associated access to the repository limits access to a restricted group that may exclude some members of the recipient list. This often creates manual process challenges that involve coming to terms with the databases owner, seeking access, granting access and returning to the email once again when access has been granted to reference the content in question, thus creating displacement and discontinuity for the recipient.

SUMMARY OF DISCLOSURE

In a first implementation, a method includes receiving an indication of an email being generated for at least one recipient. The email is analyzed to determine if the email includes at least one link to a piece of content on a remote content resource. If the email includes at least one link to a piece of content on a remote content resource, the at least one recipient is analyzed to determine if the at least one recipient has sufficient rights to access the piece of content on the remote content resource.

One or more of the following features may be included. If the at least one recipient has sufficient rights to access the remote content resource, the email may be allowed to be transmitted to the at least one recipient.

If the at least one recipient does not have sufficient rights to access the remote content resource, a warning may be provided to the composer of the email concerning the at least one recipient not having sufficient rights to access the remote content resource.

If the at least one recipient does not have sufficient rights to access the remote content resource, the email may be modified to generate a modified email. The modified email may be allowed to be transmitted to the at least one recipient.

Modifying the email may include attaching a copy of the piece of content to the email to generate the modified email. Modifying the email may include embedding a copy of the piece of content within the email to generate the modified email.

The at least one recipient may include a first recipient who has sufficient rights to access the remote content resource, and a second recipient who does not have sufficient rights to access the remote content resource. The email may be allowed to be transmitted to the first recipient. A warning may be provided to the composer of the email concerning the second recipient not having sufficient rights to access the remote content resource.

The at least one recipient may include a first recipient who has sufficient rights to access the remote content resource, and a second recipient who does not have sufficient rights to access the remote content resource. The email may be allowed to be transmitted to the first recipient. The email to the second recipient may be modified to generate a modified email and the modified email may be allowed to be transmitted to the second recipient. Modifying the email may include one or more of: embedding a copy of the piece of content within the email to generate the modified email; and attaching a copy of the piece of content to the email to generate the modified email.

The resource may be chosen from the group consisting of a server computer, a collaborative workspace, a database, and a website.

In another implementation, a computer program product resides on a computer readable medium that has a plurality of instructions stored on it. When executed by a processor, the instructions cause the processor to perform operations including receiving an indication of an email being generated for at least one recipient. The email is analyzed to determine if the email includes at least one link to a piece of content on a remote content resource. If the email includes at least one link to a piece of content on a remote content resource, the at least one recipient is analyzed to determine if the at least one recipient has sufficient rights to access the piece of content on the remote content resource.

One or more of the following features may be included. If the at least one recipient has sufficient rights to access the remote content resource, the email may be allowed to be transmitted to the at least one recipient.

If the at least one recipient does not have sufficient rights to access the remote content resource, a warning may be provided to the composer of the email concerning the at least one recipient not having sufficient rights to access the remote content resource.

If the at least one recipient does not have sufficient rights to access the remote content resource, the email may be modified to generate a modified email. The modified email may be allowed to be transmitted to the at least one recipient.

Modifying the email may include attaching a copy of the piece of content to the email to generate the modified email. Modifying the email may include embedding a copy of the piece of content within the email to generate the modified email.

The at least one recipient may include a first recipient who has sufficient rights to access the remote content resource, and a second recipient who does not have sufficient rights to access the remote content resource. The email may be allowed to be transmitted to the first recipient. A warning may be provided to the composer of the email concerning the second recipient not having sufficient rights to access the remote content resource.

The at least one recipient may include a first recipient who has sufficient rights to access the remote content resource, and a second recipient who does not have sufficient rights to access the remote content resource. The email may be allowed to be transmitted to the first recipient. The email to the second recipient may be modified to generate a modified email and the modified email may be allowed to be transmitted to the second recipient. Modifying the email may include one or more of: embedding a copy of the piece of content within the email to generate the modified email; and attaching a copy of the piece of content to the email to generate the modified email.

The resource may be chosen from the group consisting of a server computer, a collaborative workspace, a database, and a website.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
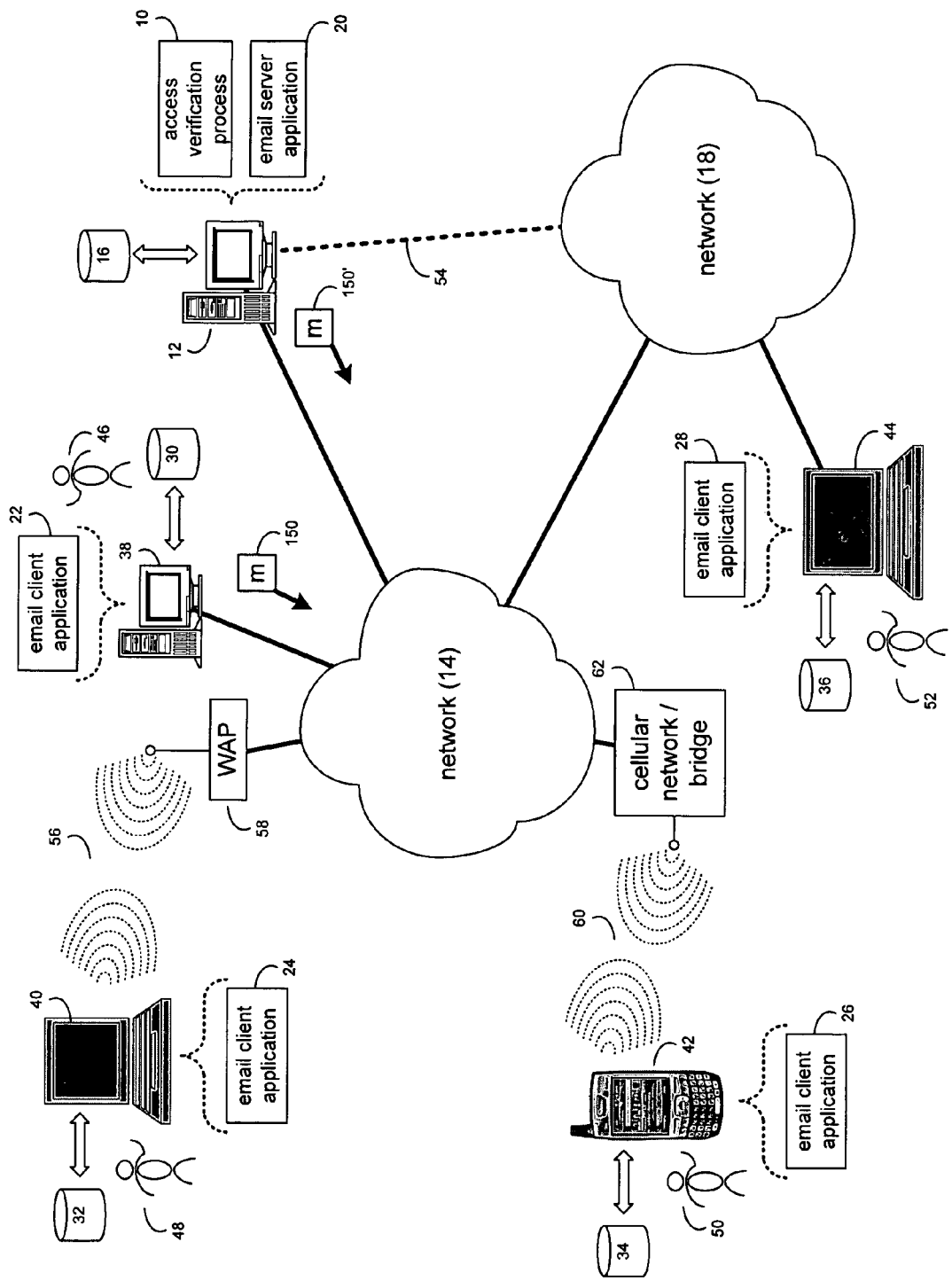
FIG. 1 is a diagrammatic view of a access verification process and an email client application coupled to a distributed computing network.

System Overview:

Referring to FIG. 1, there is shown access verification process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be 6a web server (or a series of servers) running a network operating system, examples of which may include but are not limited to: Microsoft Windows XP Server™; Novell Netware™; or Redhat Linux™, for example.

As will be discussed below in greater detail, access verification process 10 may receive an indication of an email being generated for at least one recipient. The email may be analyzed to determine if the email includes a link to a piece of content on a remote content resource. If the email includes a link to a piece of content on a remote content resource, the at least one recipient may be analyzed to determine if the at least one recipient has sufficient rights to access the piece of content on the remote content resource.

The instruction sets and subroutines of access verification process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute email server application 20, examples of which may include but are not limited to Lotus Domino™ Server and Microsoft Exchange™ Server. Email server application 20 may be a mail transfer agent that may store and route email to one or more email client applications 22, 24, 26, 28, examples of which may include but are not limited to Lotus Notes™ and Microsoft Outlook™. Access verification process 10 may be a stand alone application that interfaces with email server application 20 or an applet/application that is executed within email server application 20.

The instruction sets and subroutines of email server application 20, which may be stored on storage device 16 coupled to server computer 12 may be executed by one or more processors (not shown) and one or more memory architectures (not shown) incorporated into server computer 12.

The instruction sets and subroutines of email client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of computing devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using email client applications 22, 24, 26, 28, users 46, 48, 50, 52 may access email server application 20 and may retrieve and/or organize email messages.

Users 46, 48, 50, 52 may access email server application 20 directly through the device on which the email client application (e.g., email client applications 22, 24, 26, 28) is executed, namely client electronic devices 38, 40, 42, 44, for example. Users 46, 48, 50, 52 may access email server application 20 directly through network 14 or through secondary network 18. Further, server computer 12 (i.e., the computer that executes email server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

The Access Verification Process:

For the following discussion, email client application 22 is going to be described for illustrative purposes. However, this is not intended to be a limitation of this disclosure, as other email client applications (e.g., email client applications 24, 26, 28) may be equally utilized.

Figure 2:
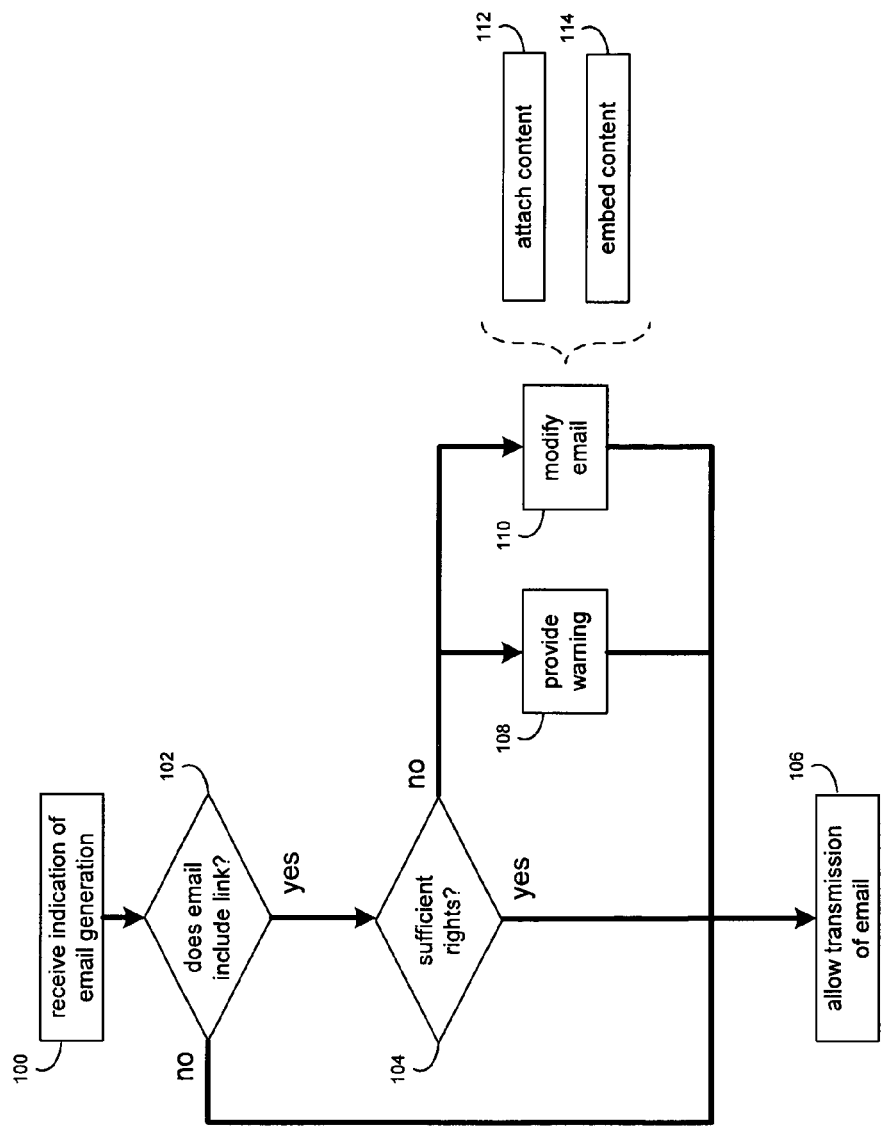
FIG. 2 is a flowchart of the access verification process of FIG. 1.
Figure 3:
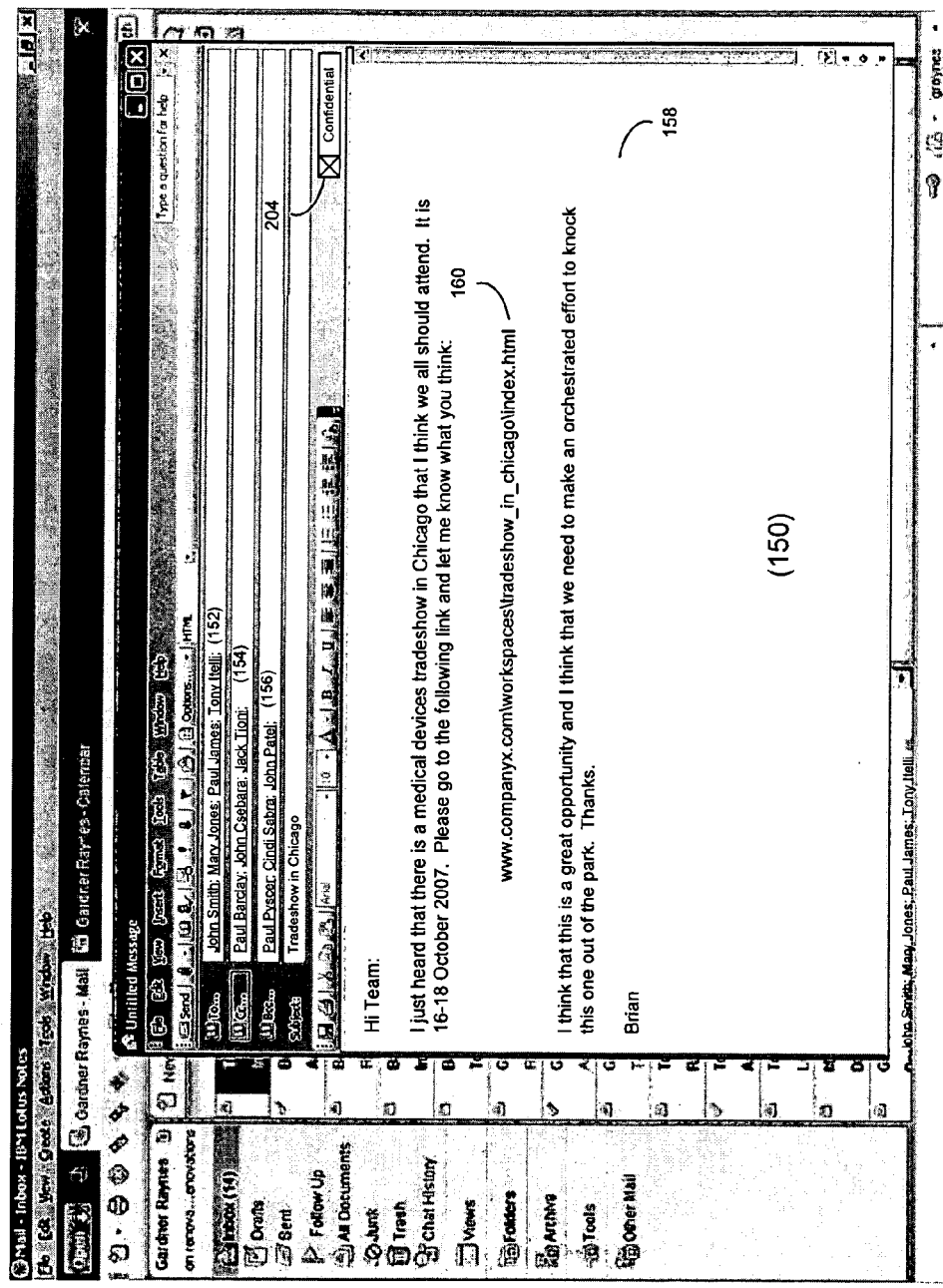
FIG. 3 is a diagrammatic view of a display screen rendered by the email client application of FIG. 1.

Referring also to FIGS. 2 & 3, email client application 22 (alone or in combination with access verification process 10 and/or email server application 20) may allow a user (e.g., user 46) to generate email message 150 that is addressed to one or more recipients. As is known in the art, email message 150 may be addressed to "TO" recipients 152, "CC" (i.e., carbon copy) recipients 154, and "BCC" (i.e., blind carbon copy) recipients 156. Further and as is known in the art, email message 150 may include message content 158 (i.e., the body of the email message).

Upon access verification process 10 receiving 100 an indication of an email (e.g., email message 150) being generated for transmission to at least one recipient, access verification process 10 may analyze email 150 to determine if the email includes a link to a piece of content on a remote content resource, wherein the remote content resource is representative of the location where the piece of content is located. Examples of the remote content resource may include but are not limited to: a server computer (e.g., server computer 12), a database (e.g., a database served by server computer 12 and stored on storage device 16 coupled to server computer 12), a website (e.g., a website served by server computer 12 or another server; not shown), any computer/device/infrastructural component that is accessible over a wired/wireless computer network, and a collaborative workspace.

Examples of a collaborative workspace may include but are not limited to: a wiki; a blog; a team space; a discussion group; and an activity group.

A wiki is a website that may allow visitors to add, remove, and edit content. A collaborative technology for organizing information on websites, wikis may allow for linking amongst any number of webpages. Wikis may be editable by the general public.

A blog is a website in which entries may be written in a chronological order and may be displayed in reverse chronological order. Blogs may provide commentary or news on a particular subject such as food, politics, or local news; or may function as a personal online diary.

A team space is a web-based collaborative workspace for managing shared work processes and maintaining shared artifacts in a project that may span months or years. A teamspace may cover both synchronous and asynchronous cross-company team activities and may provide a seamless transition between different work modes.

A discussion group is a web application for holding discussions and posting user-generated content. The term "group" may refer to the entire community or to a specific sub-forum dealing with a distinct topic. Messages within a sub-forum may be displayed either in chronological order or as threaded discussions.

When analyzing e-mail 150 to determine if 102 e-mail 150 includes a link to a piece of content on a remote content resource, access verification process 10 may analyze e-mail message 150 for the presence of one or more terms indicative of a link. Examples of such terms indicative of a link may include but are not limited to a server name, a computer name, a disk drive name, a uniform resource locator, a Web address, a database name, and a collaborative workspace name, for example. While the foregoing list is intended to be illustrative, it is not intended to be all-inclusive nor is it intended to be a limitation of this disclosure.

In this particular example, e-mail 150 is shown to include a link 160 as follows:

www.companyx.com\workspaces\tradeshow_in_chicago\index.html

Assume, for illustrative purposes, that link 160 defines a piece of content (e.g., index.html) available on a remote content resource (e.g., the website of "Company X". Further, assume that link 160 is a link to a website within an intranet that is only available to authorized employees of "Company X". Accordingly, as link 160 is a link to an intranet website, in order to access the piece of content (e.g., index.html) available on remote content resource (e.g., the intranet of "Company X"), the recipient of e-mail 150 may be required to have sufficient rights to access this piece of content.

In this particular example, email message 150 is shown to be addressed to: "TO" recipients 152 (e.g., John Smith, Mary Jones, Paul James & Tony Itelli); "CC" recipients 154 (e.g., Paul Barclay, John Csebara & Jack Tioni); and "BCC" recipients 156 (e.g., Paul Pyscer, Cindi Sabra & John Patel). Assume for illustrative purposes that all but two recipients (e.g., Paul Barclay and John Patel) are employees the of "Company X".

As discussed above, access verification process 10 may analyze e-mail 150 to determine if 102 email 150 includes a link to a piece of content included on a remote content resource. If 102 access verification process 10 determines that e-mail 150 includes a link to a piece of content on a remote content resource, the recipient(s) defined within e-mail 150 may be analyzed to determine if 104 the recipient(s) have sufficient rights to access the piece of content on the remote content resource.

When analyzing e-mail 150 to determine if the intended recipient(s) of e-mail 150 have sufficient rights to access the piece of content on the remote content resource, each member of the list of intended recipients may be analyzed to determine if each recipient has sufficient rights. For example and as discussed above, e-mail 150 is addressed to ten intended recipients namely John Smith, Mary Jones, Paul James, Tony Itelli, Paul Barclay, John Csebara, Jack Tioni, Paul Pyscer, Cindi Sabra and John Patel.

As discussed above, assume for illustrative purposes at all but two recipients (e.g., Paul Barclay and John Patel) are employees the of "Company X". Accordingly, when analyzing the intended recipients of e-mail 150 to determine if each of the recipients has sufficient rights to access the piece of content on the remote content resource, access verification process 10 may determine that eight of the intended recipients (namely John Smith, Mary Jones, Paul James, Tony Itelli, John Csebara, Jack Tioni, Paul Pyscer, and Cindi Sabra) are employees of "Company X". Access verification process 10 may make this determination by comparing each of these eight intended recipients to the employee e-mail distribution list of "Company X". Naturally and for illustrative purposes, this assumes that within "Company X", these eight intended recipients have sufficient rights to access this piece of content on this remote content resource.

Further, assume for illustrative purposes that recipients Paul Barclay and John Patel are not employees of "Company X" and, therefore, will not have access to the piece of content on the remote content resource (as defined by link 160), namely index.html on the intranet of "Company X".

If 104 access verification process 10 determines that at least one recipient has sufficient rights to access the remote content resource, email 150 may be allowed to be transmitted 106 to the intended recipient. Continuing with the above stated example, as e-mail 150 is addressed to ten intended recipients and eight of the intended recipients (namely John Smith, Mary Jones, Paul James, Tony Itelli, John Csebara, Jack Tioni, Paul Pyscer, and Cindi Sabra) have sufficient rights to access the remote content resource, access verification process 10 may allow 106 e.g. email server application 22 to transmit e-mail message 152 a portion of the intended recipients (namely John Smith, Mary Jones, Paul James, Tony Itelli, John Csebara, Jack Tioni, Paul Pyscer, and Cindi Sabra).

However, concerning two of the intended recipients (e.g. Paul Barclay and John Patel), access verification process 10 may not immediately allow 106 e.g. email server application 22 to transmit e-mail 152 to intended recipients Paul Barclay and John Patel.

If 104 at least one of the recipients does not have sufficient rights to access the remote content resource, access verification process 10 may provide 108 a warning to the composer (e.g., user 26) of email message 150 concerning the recipient(s) that do not have sufficient rights to access the remote content resource. Continuing with the above-stated example and as discussed above, two intended recipients, namely Paul Barclay and John Patel, do not have sufficient rights to access the remote content resource defined by link 160. Accordingly access verification process 10 may provide to user 26 a warning concerning the fact that these two recipients do not have access to the remote content resource.

Figure 4:
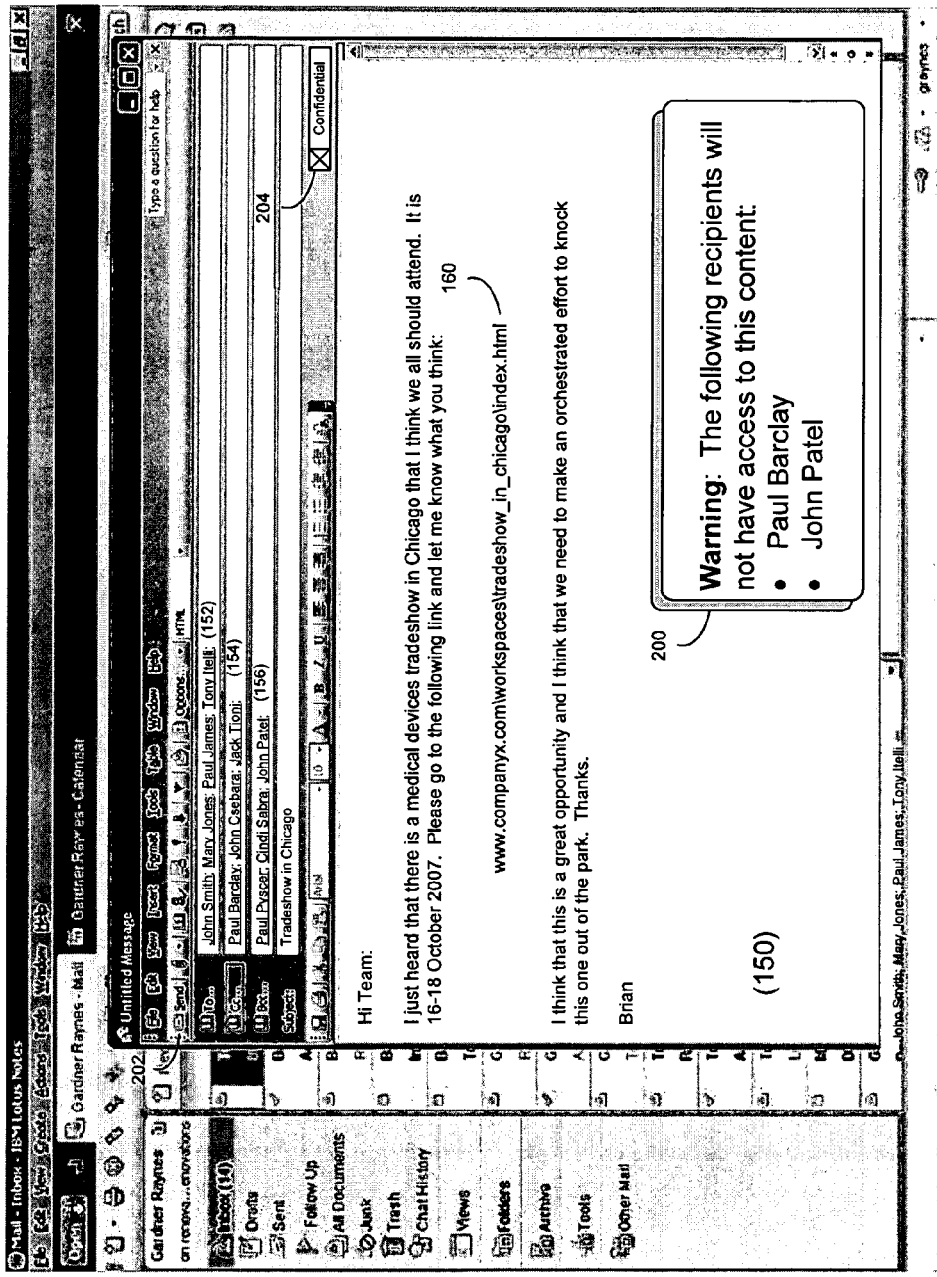
FIG. 4 is a diagrammatic view of a display screen rendered by the access verification process and/or email client application of FIG. 1.

Referring also to FIG. 4, access verification process 10 may provide 108 user 26 (e.g., in the form of pop-up warning window 200) with a warning concerning the fact that at least one intended recipient (namely Paul Barclay and John Patel) do not have sufficient rights to access the remote content resource defined by link 160. The manner in which access verification process 10 provides a warning to user 26 (e.g. pop-up warning window 200) is for illustrative purposes only and is not intended to be a limitation of this disclosure. Specifically, access verification process 10 may provide a warning to user 26 and various other manners, such as an audible beep or an inability to select send button 202.

By providing 108 a warning to user 26, access verification process 10 may allow user 26 to e.g. delete recipients Paul Barclay and John Patel from the intended recipients list or provide the content located on a remote content resource (to which they do not have access) using alternative distribution means.

As an alternative to (or in addition to) providing 108 a warning to user 26, access verification process 10 may modify 110 e-mail 150 to generate modified email 150', which may then be transmitted 106 to the intended recipients.

When modifying 110 email 150, access verification process 10 may attach 112 a copy of the piece of content (defined by link 160) to email 150 to generate modified email 150'. For example, a copy of index.html may be attached 112 to e-mail 150, thus allowing recipients Paul Barclay and/or John Patel to review the piece of content pointed to by link 160 regardless of the fact that recipients Paul Barclay and/or John Patel do not have access to the remote content resource pointed to by link 160. Accordingly, in the event that the piece of content is a word processing document (e.g. content.doc), access verification process 10 may attach 112 a copy of the word processing document to e-mail 150 to allow for review by Paul Barclay and/or John Patel. Similarly, in the event that the piece of content is a database record, access verification process 10 may attach 112 a copy of the database record to e-mail 150 to allow intended recipients Paul Barclay and/or Jeff Patel to review the database record.

As an alternative to attaching 112 a copy of the piece of content to e-mail 150, access verification process 10 may modify 110 email 150 by embedding 114 a copy of the piece of content within the email to generate the modified email 150'. For example, modified e-mail 150' may be an HTML-based e-mail into which the content of index.html (as pointed to by link 160) is copied. Accordingly, by embedding the content pointed to by link 160 into e-mail 150, intended recipients Paul Barclay and/or John Patel may be able to review the piece of content pointed to by link 160 regardless of the fact that recipients Paul Barclay and/or Jeff Patel do not have access to the remote content resource pointed to by link 160.

Additionally, access verification process 10 may allow e.g., user 26 to define email 150 as "confidential", such that once email 150 is defined as "confidential", the above-described content will neither be attached 112 nor embedded 114 into email 150. For example, while authoring email 150, user 26 may select confidential checkbox 204. Accordingly, when processing email 150, email verification process 10 may determine whether email 150 is considered confidential by e.g., examining the status of a bit (not shown) associated with confidential checkbox 204. In the event that such a bit is set (i.e., thus indicating a confidential email message), access verification process 10 may prohibit content from being either attached 112 or embedded 114.

A number of implementations have been described. Nevertheless, it will be understood that various modifications may be made. Accordingly, other implementations are within the scope of the following claims.

What is claimed is:

1. A method comprising:
   receiving, via one or more computing devices, an indication of an email being generated for at least one recipient;
   analyzing, via the one or more computing devices, the email, before the email is sent, to determine if the email includes at least one link to a piece of content on a remote content resource;
   if the email includes at least one link to a piece of content on a remote content resource, analyzing, via the one or more computing devices, before the email is sent, the at least one recipient to determine if the at least one recipient has sufficient rights to access the piece of content on the remote content resource; and
   if the at least one recipient does not have sufficient rights to access the remote content resource, providing a notification to a composer of the email concerning the at least one recipient not having sufficient rights to access the remote content resource.

2. The method of claim 1 further comprising:
if the at least one recipient has sufficient rights to access the remote content resource, allowing transmission of the email to the at least one recipient.

3. The method of claim 1, further comprising designating the email as confidential and prohibiting one of attaching and embedding a copy of the piece of content.

4. The method of claim 1 further comprising:
if the at least one recipient does not have sufficient rights to access the remote content resource, modifying the email to generate a modified email; and
allowing transmission of the modified email to the at least one recipient.

5. The method of claim 4 wherein modifying the email includes attaching a copy of the piece of content to the email to generate the modified email.

6. The method of claim 4 wherein modifying the email includes embedding a copy of the piece of content within the email to generate the modified email.

7. The method of claim 1 wherein the at least one recipient includes a first recipient who has sufficient rights to access the remote content resource, and a second recipient who does not have sufficient rights to access the remote content resource; the method further comprising:
allowing transmission of the email to the first recipient;
providing the notification to the composer of the email concerning the second recipient not having sufficient rights to access the remote content resource.

8. The method of claim 1 wherein the at least one recipient includes a first recipient who has sufficient rights to access the remote content resource, and a second recipient who does not have sufficient rights to access the remote content resource; the method further comprising:
allowing transmission of the email to the first recipient;
modifying the email to the second recipient to generate a modified email; and
allowing transmission of the modified email to the second recipient.

9. The method of claim 8 wherein modifying the email includes one or more of:
embedding a copy of the piece of content within the email to generate the modified email; and
attaching a copy of the piece of content to the email to generate the modified email.

10. The method of claim 1 wherein the resource is chosen from the group consisting of a server computer, a collaborative workspace, a database, and a website.

11. A computer program product residing on a non-transitory computer readable medium having a plurality of instructions stored thereon which, when executed by a processor, cause the processor to perform operations comprising:
receiving an indication of an email being generated for at least one recipient;
analyzing the email, before the email is sent, to determine if the email includes at least one link to a piece of content on a remote content resource;
if the email includes at least one link to a piece of content on a remote content resource, analyzing, before the email is sent, the at least one recipient to determine if the at least one recipient has sufficient rights to access the piece of content on the remote content resource; and
if the at least one recipient does not have sufficient rights to access the remote content resource, providing a notification to a composer of the email concerning the at least one recipient not having sufficient rights to access the remote content resource.

12. The computer program product of claim 11 further comprising instructions for:
if the at least one recipient has sufficient rights to access the remote content resource, allowing transmission of the email to the at least one recipient.

13. The computer program product of claim 11, further comprising instructions for designating the email as confidential and prohibiting one of attaching and embedding a copy of the piece of content.

14. The computer program product of claim 11 further comprising instructions for:
if the at least one recipient does not have sufficient rights to access the remote content resource, modifying the email to generate a modified email; and
allowing transmission of the modified email to the at least one recipient.

15. The computer program product of claim 14 wherein the instructions for modifying the email include instructions for attaching a copy of the piece of content to the email to generate the modified email.

16. The computer program product of claim 14 wherein the instructions for modifying the email include instructions for embedding a copy of the piece of content within the email to generate the modified email.

17. The computer program product of claim 11 wherein the at least one recipient includes a first recipient who has sufficient rights to access the remote content resource, and a second recipient who does not have sufficient rights to access the remote content resource; the computer program product further comprising instructions for:
allowing transmission of the email to the first recipient;
providing the notification to the composer of the email concerning the second recipient not having sufficient rights to access the remote content resource.

18. The computer program product of claim 11 wherein the at least one recipient includes a first recipient who has sufficient rights to access the remote content resource, and a second recipient who does not have sufficient rights to access the remote content resource; the computer program product further comprising instructions for:
allowing transmission of the email to the first recipient;
modifying the email to the second recipient to generate a modified email; and
allowing transmission of the modified email to the second recipient.

19. The computer program product of claim 18 wherein the instructions for modifying the email include instructions for one or more of:
embedding a copy of the piece of content within the email to generate the modified email; and
attaching a copy of the piece of content to the email to generate the modified email.

20. The computer program product of claim 11 wherein the resource is chosen from the group consisting of a server computer, a collaborative workspace, a database, and a website.

* * * * *